United States Patent
Izumi

(10) Patent No.: US 6,719,677 B2
(45) Date of Patent: Apr. 13, 2004

(54) AUTOMATIC TOOL CHANGER

(75) Inventor: Satohiro Izumi, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/011,306

(22) Filed: Dec. 11, 2001

(65) Prior Publication Data

US 2002/0052272 A1 May 2, 2002

(30) Foreign Application Priority Data

Dec. 26, 2000 (JP) ........................... 2000-394510

(51) Int. Cl.⁷ .............................................. B23Q 3/157
(52) U.S. Cl. .................... 483/1; 483/4; 483/7; 483/66; 483/69; 318/672
(58) Field of Search .............................. 483/1, 4, 7, 66, 483/67, 68, 58, 60, 69; 318/696, 560, 672

(56) References Cited

U.S. PATENT DOCUMENTS

| 3,689,820 A | * | 9/1972 | Hiroyasu .................... 318/594 |
| 3,744,648 A | * | 7/1973 | Kuhnert ........................ 483/6 |
| 3,775,837 A | | 12/1973 | Tomita et al. |
| 4,899,998 A | | 2/1990 | Teramachi |
| 5,144,740 A | * | 9/1992 | Yasuda ........................ 483/4 |

FOREIGN PATENT DOCUMENTS

| JP | 358010439 A | * | 1/1983 | ................. 483/66 |
| JP | 362053198 A | * | 3/1987 | ................ 318/696 |
| JP | 10-248282 | | 9/1998 | |
| JP | 2000-126968 | | 5/2000 | |
| JP | 2000-153318 | | 6/2000 | |

* cited by examiner

*Primary Examiner*—Erica Cadugan
(74) *Attorney, Agent, or Firm*—Westerman, Hattori, Daniels & Adrian, LLP

(57) ABSTRACT

The present invention is an automatic tool changer. The automatic tool changer is adapted to perform a tool magazine indexing operation in response to an indexing command and perform a tool changing operation in response to a tool changing command. If an indexing command is not output within a predetermined time period after completion of a tool changing operation, power to the servo motor driving the tool magazine is temporarily stopped and when the next indexing command is output, the power to the servo motor is resumed to perform the indexing operation. If a tool changing command is not output within a predetermined time period after completion of the tool magazine indexing operation, the power supply to the servo motor is temporarily stopped and when the next tool changing command is output, the power to the servo motor is resumed to perform the tool changing operation.

7 Claims, 4 Drawing Sheets

AUTOMATIC TOOL CHANGER

BACKGROUND OF THE INVENTION

1. Field of the Invention

The present invention relates to an automatic tool changer to be mounted in a machine tool and, more particularly, to a tool changer having a tool magazine which is driven by a servo motor.

2. Description of Related Art

Complex machine tools such as machining centers which are capable of performing a plurality of machining operations such as milling and drilling operations are generally mounted with an automatic tool changer which is adapted to select a proper tool from a plurality of types of tools and automatically attach and detach the tool to a rotary tool spindle.

Such an automatic tool changer typically includes a tool magazine having a plurality of tool pots arranged in a closed loop, and is adapted to rotatively drive the tool magazine in accordance with an indexing command outputted from a programmable controller (PMC) on the basis of a machining program for positioning a predetermined tool retained in one of the tool pots in a tool changing position, and then exchange a tool attached to the rotary tool spindle and the tool positioned in the tool changing position with the use of a tool changer arm provided between the tool changing position and the rotary tool spindle in accordance with a tool changing command outputted from the PMC on the basis of the machining program.

The conventional automatic tool changer employs a general-purpose motor as a drive source for rotatively driving the tool magazine and, therefore, a mechanical lock mechanism is additionally provided for arresting the tool magazine in a proper angular position after the rotation of the tool magazine. In recent years, a servo motor having a retention capability has been employed instead of the general-purpose motor. The retention capability of the servo motor makes it possible to arrest the tool magazine in the angular position after the rotation of the tool magazine. This is advantageous in that the aforesaid mechanical lock mechanism can be obviated.

Where the tool magazine is to be arrested in the angular position by the retention capability of the servo motor, however, power supply to the servo motor should be continued during the arrest of the tool magazine, thereby entailing a greater power consumption than in the case where the general-purpose motor is employed for the rotation of the tool magazine.

Where the servo motor is employed as the driving source for the tool magazine, an electromagnetic brake which is operable when the power supply to the servo motor is stopped is generally provided for preventing unintended rotation of the tool magazine at emergency stop of the servo motor. During the arrest of the tool magazine which requires the power supply to the servo motor, power consumption is entailed for release of the electromagnetic brake. Therefore, the total power consumption is further increased.

The tool magazine and the servo motor are generally coupled with each other via ordinary gears (e.g., spur gears) rather than via a ball screw, so that the servo motor is significantly influenced by a torque of the tool magazine. The tool magazine typically has a rotation orbit defined in a vertical plane. Where a relatively heavy tool is held in an upper tool pot when the tool magazine is arrested, the weight of the tool produces a torque in the tool magazine. The torque is suppressed by the retention capability of the servo motor, so that the servo motor is subjected to an unbalanced load for a long period of time. Accordingly, there is a possibility that the servo motor is overheated during the arrest of the tool magazine, through there is no problem during the rotative driving of the tool magazine.

Therefore, a servo motor having a greater steady torque should be employed as the drive source for the tool magazine in consideration of the unbalanced load generated during the arrest of the tool magazine.

It is therefore an object of the present invention to provide an automatic tool changer which employs a servo motor as a drive source for a tool magazine and, yet, features a minimized power consumption and a reduced steady torque of the servo motor.

SUMMARY OF THE INVENTION

In accordance with a first aspect of the present invention to achieve the aforesaid object, there is provided an automatic tool changer which comprises a tool magazine to be rotatively driven by a servo motor and is adapted to perform a tool magazine indexing operation in accordance with an indexing command and then perform a tool changing operation in accordance with a tool changing command, wherein power supply to the servo motor is temporarily stopped if the next indexing command is not outputted within a predetermined time period after completion of the tool changing operation and, when the next indexing command is outputted, the power supply to the servo motor is resumed.

In the automatic tool changer having the aforesaid construction, the power supply to the servo motor for driving the tool magazine is kept stopped until the next indexing command is outputted after a lapse of the predetermined time period from the completion of the tool changing operation. Therefore, a power consumption required for the servo motor to arrest the tool magazine and a power consumption required for release of an electromagnetic brake can be reduced as compared with the conventional automatic tool changer in which the power supply to the servo motor is continued during the arrest of the tool magazine.

In accordance with a second aspect of the present invention, the power supply to the servo motor is temporarily stopped if the next tool changing command is not outputted within the predetermined time period after completion of the tool magazine indexing operation and, when the next tool changing command is outputted, the power supply to the servo motor is resumed. This arrangement reduces the power consumption required for the servo motor to arrest the tool magazine and the power consumption required for the release of the electromagnetic brake before the next tool changing command is outputted after a lapse of the predetermined time period from the completion of the indexing operation. Therefore, the power consumption of the automatic tool changer can further effectively be reduced.

Further, the electromagnetic brake is operative to prevent the tool magazine from being significantly offset from an index position during the stop of the power supply to the servo motor. When the power supply to the servo motor is resumed upon the output of the tool changing command, a positional offset of the tool magazine, if any, can immediately be corrected. The tool changing operation, even if achieved by direct tool exchange between the tool magazine and a rotary tool spindle, can smoothly be performed without significantly influencing a tact time.

As described above, the tool magazine is retained not by the retention capability of the servo motor but by the electromagnetic brake during the arrest of the tool magazine, i.e., until the next indexing command is outputted after the lapse of the predetermined time period from the completion of the tool changing operation and until the next tool changing command is outputted after the lapse of the predetermined time period from the completion of the indexing operation. Even if a relatively heavy tool is located in an upper position of the tool magazine, the servo motor is not subjected to an unbalanced load. Therefore, a servo motor having a smaller steady torque can be employed as the servo motor for driving the tool magazine without consideration of the overheat of the servo motor which may otherwise occur during the arrest of the tool magazine.

The foregoing and other objects, features and effects of the present invention will become more apparent from the following description of the preferred embodiments with reference to the attached drawings.

DESCRIPTION OF THE PREFERRED EMBODIMENTS

Figure 1:
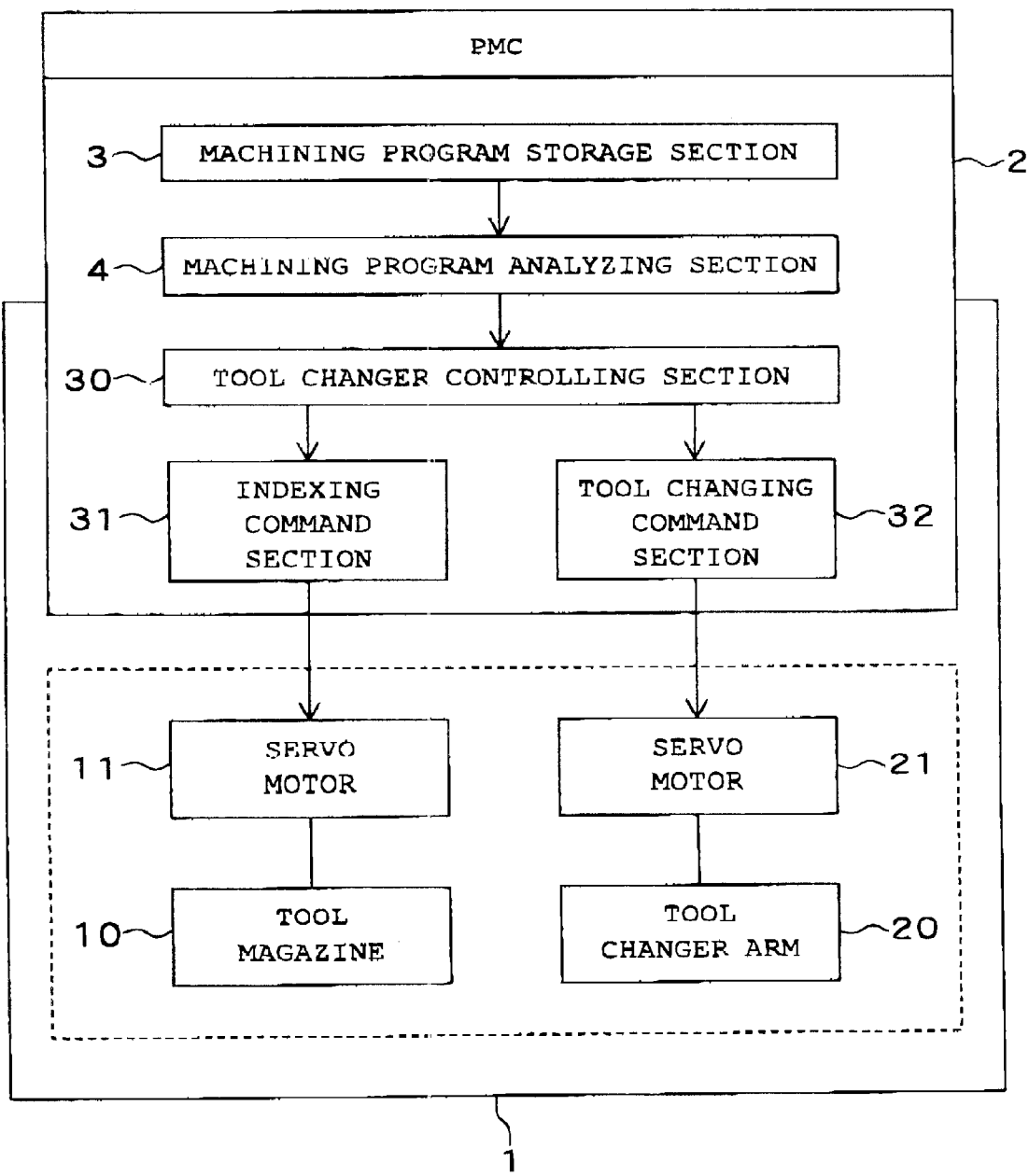
FIG. 1 is a block diagram illustrating a control system of an automatic tool changer according to one embodiment of the present invention.

With reference to the attached drawings, the present invention will hereinafter be described by way of embodiments thereof. FIG. 1 illustrates an automatic tool changer 1 to be mounted in an NC machine tool. As shown, the automatic tool changer 1 includes a tool magazine 10 having a plurality of tool pots provided in a circular arrangement, a tool changer arm 20 adapted for direct tool exchange between the tool magazine 10 and a rotary tool spindle, and a tool changer controlling section 30 for controlling operations of the tool magazine 10 and the tool changer arm 20 in accordance with a machining program. The tool magazine 10 and the tool changer arm 20 are rotatively driven by servo motors 11 and 21, respectively.

The tool magazine 10 is provided with an electromagnetic brake which is operative when a power supply to the servo motor 11 is stopped. Thus, unintended rotation of the tool magazine 10 is prevented at emergency stop of the servo motor 11.

The tool changer controlling section 30 is provided in a programmable controller (PMC) 2 mounted in a numerical controller of the NC machine tool. The tool changer controlling section 30 is adapted to output an indexing command for the tool magazine 10 and a tool changing command for the tool changer arm 20 to the servo motors 11 and 21 via an indexing command section 31 and a tool changing command section 32, respectively, on the basis of the machining program which is stored in a machining program storage section 3 in the PMC 2 and analyzed by a machining program analyzer 4 in the PMC 2.

Figure 2:
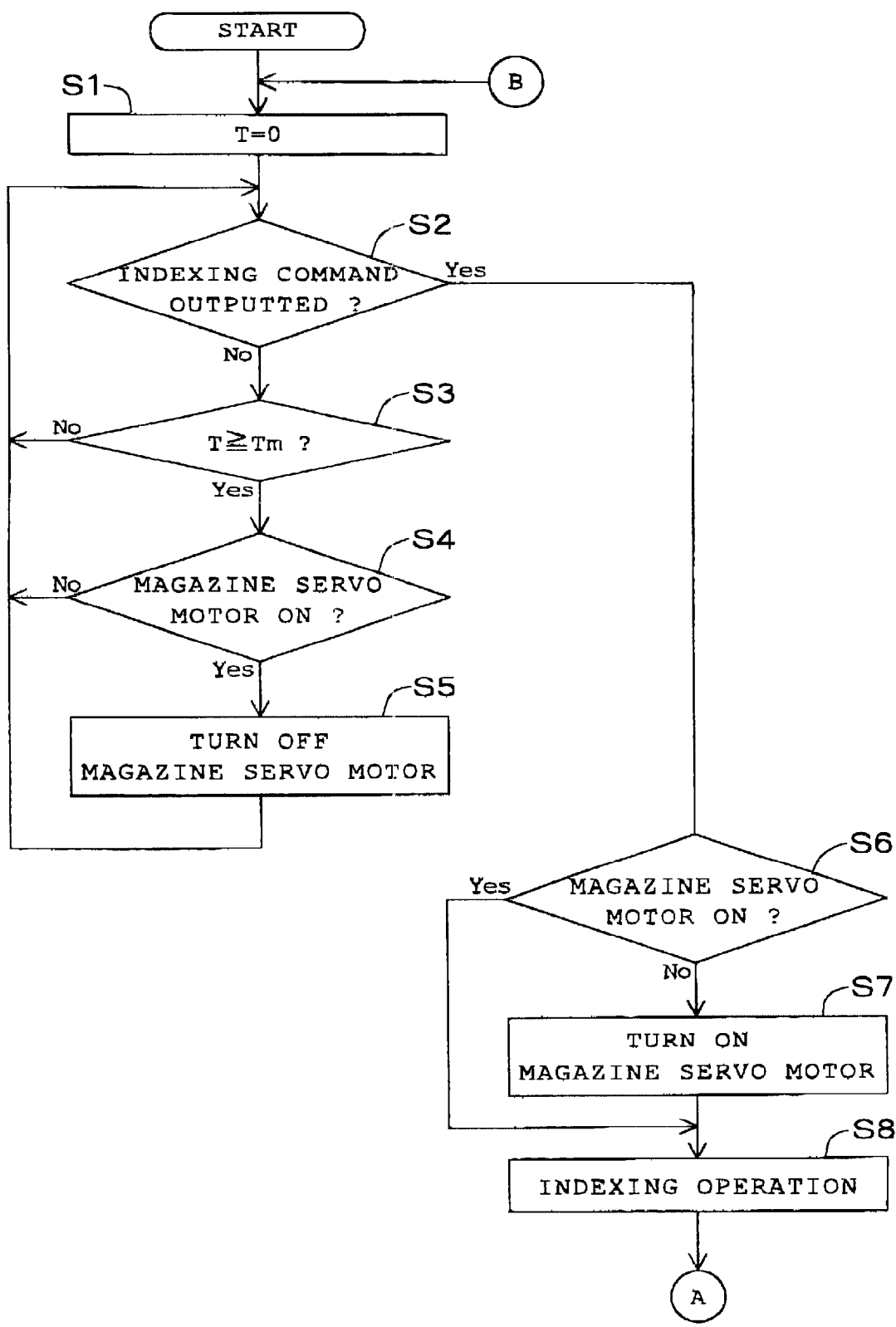
FIGS. 2 and 3 are flow charts for explaining a tool changing process to be performed by the automatic tool changer.
Figure 3:
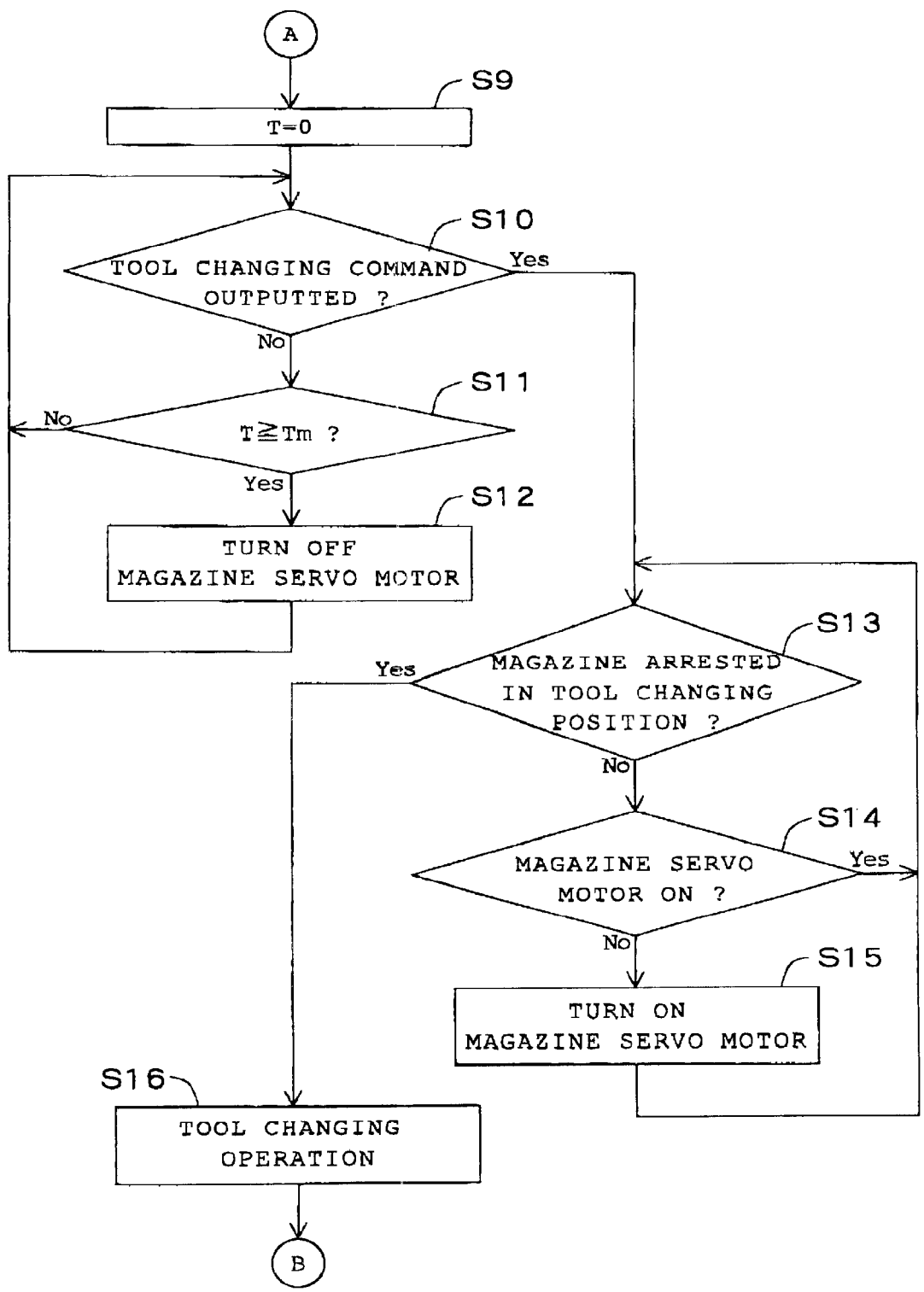

A tool changing process to be performed by the automatic tool changer 1 having the aforesaid construction will be described with reference to flow charts shown in FIGS. 2 and 3. As shown in FIG. 2, a timer is first initialized (Step S1), and then it is judged whether an indexing command is outputted from the tool changer controlling section 30 (Step S2).

If the indexing command is not outputted from the tool changer controlling section 30, the process goes to Step S3 to judge whether a predetermined time period Tm (e.g., about 10 seconds) has elapsed from a time point at which the timer is initialized. If the predetermined time period Tm has not elapsed, the process returns to Step S2. If the predetermined time period Tm has elapsed, the process goes to Step S4 to judge whether electric power is supplied to the servo motor 11 for driving the tool magazine 10. If the electric power is not supplied to the servo motor 11, the process returns to Step S2. If the electric power is supplied to the servo motor 11 in Step S4, the power supply to the servo motor 11 is stopped (Step S5), and then the process returns to Step S2.

On the other hand, if the indexing command is outputted from the tool changer controlling section 30 in Step S2, the process goes to Step S6 to judge whether the electric power is supplied to the servo motor 11 for driving the tool magazine 10. If the electric power is supplied to the servo motor 11, the process goes to Step S8 to immediately perform a tool magazine indexing operation in accordance with the indexing command. On the other hand, if the electric power is not supplied to the servo motor 11 in Step S6, the power supply to the servo motor 11 is resumed (Step S7), and the tool magazine indexing operation is performed in accordance with the indexing command (Step S8).

Upon completion of the tool magazine indexing operation performed in Step S8, the timer is initialized again (Step S9 in FIG. 3), and it is judged whether a tool changing command is outputted from the tool changer controlling section 30 (Step S10).

If the tool changing command is not outputted from the tool changer controlling section 30 in Step S10, the process goes to Step S11 to judge whether the predetermined time period Tm has elapsed from a time point at which the timer is initialized in Step S9. If the predetermined time period Tm has not elapsed, the process returns to Step S10. If the predetermined time period Tm has elapsed, the power supply to the servo motor 11 is stopped (Step S12), and then the process returns to Step S10.

On the other hand, if the tool changing command is outputted from the tool changer controlling section 30 in Step S10, the process goes to Step S13 to judge whether the tool magazine 10 is arrested in a predetermined index position at which the tool changing operation is permitted. If the tool magazine 10 is not arrested in the predetermined index position, the process goes to Step S14 to judge whether the electric power is supplied to the servo motor 11 for driving the tool magazine 10. If the electric power is supplied to the servo motor 11, the process returns to Step S13. If the electric power is not supplied to the servo motor 11, the power supply to the servo motor 11 is resumed (Step S15), and the process returns to Step S13.

On the other hand, if the tool magazine 10 is arrested in the predetermined index position in Step S13, the process goes to Step S16 to immediately cause the tool changer arm 20 to perform a tool changing operation in accordance with the tool changing command. Then, the process returns to Step S1, and the same process sequence is repeated.

If the indexing command is not outputted from the tool changer controlling section 30 within the predetermined time period Tm after the power-on of the NC machine tool, if the next indexing command is not outputted from the tool changer controlling section 30 within the predetermined time period Tm after the completion of the tool changing operation, or if the tool changing command is not outputted from the tool changer controlling section 30 within the predetermined time period Tm after the completion of the tool magazine indexing operation, the power supply to the servo motor 11 for driving the tool magazine 10 is temporarily stopped until the indexing command or the tool changing command is outputted after the lapse of the predetermined period Tm, and the tool magazine 10 is arrested by the electromagnetic brake.

Therefore, the power consumption of the servo motor 11 as well as the power consumption for the release of the electromagnetic brake can be suppressed before the indexing command or the tool changing command is outputted after the lapse of the predetermined time period Tm, i.e., during the arrest of the tool magazine 10. Therefore, the total power consumption can be reduced as compared with the conventional automatic tool changer in which the tool magazine is arrested by supplying the electric power to the servo motor.

Where the tool magazine 10 is arrested for a relatively long period of time, the power supply to the servo motor 11 is forcibly stopped, and the electromagnetic brake is actuated to arrest the tool magazine 10. Even if a relatively heavy tool is located in an upper position of the arrested tool magazine 10, the servo motor 11 is not subjected to an unbalanced load for a long period of time, thereby obviating the need for considering the overheat of the servo motor 11 during the arrest of the tool magazine 10. Therefore, a servo motor having a smaller steady torque can be employed as the servo motor 11 for driving the tool magazine 10, effectively reducing the production costs of the automatic tool changer 1.

Where the power supply to the servo motor 11 is kept stopped until the tool changing operation is started after the completion of the tool magazine indexing operation, the tool magazine 10 is arrested by the actuation of the electromagnetic brake. In this case, the tool magazine 10 cannot be arrested as accurately as in the case where the tool magazine 10 is arrested by the retention capacity of the servo motor 11. However, the tool magazine 10 is prevented from being significantly offset from the index position. By resuming the power supply to the servo motor 11 upon the output of the tool changing command, a positional offset of the tool magazine 10, if any, can immediately be corrected, so that the tool changing operation can smoothly be performed without significantly influencing a tact time.

If the tact time is considered critical, the power supply to the servo motor 11 may be continued until the tool changing operation is completed after the completion of the tool magazine indexing operation.

Although the automatic tool changer 1 is adapted for the direct tool exchange between the tool magazine 10 and the rotary tool spindle of the NC machine tool in this embodiment, the present invention is not limited thereto. The present invention may be applied to an automatic tool changer which is adapted for tool exchange between a tool magazine and a rotary tool spindle of a machine tool via a waiting tool pot. A tool changing process to be performed in this case will hereinafter be explained.

In the automatic tool changer adapted for the tool exchange between the tool magazine and the rotary tool spindle of the machine tool via the waiting tool pot, a process sequence before the completion of the tool magazine indexing operation is performed in the same manner as shown in the flow chart of FIG. 2 and, therefore, no explanation will be given thereto. A process sequence after the completion of the indexing operation will be described with reference to FIG. 4.

Upon the completion of the tool magazine indexing operation, a tool held by the tool magazine 10 is transferred to the waiting tool pot (Step S17), and the power supply to the servo motor 11 for driving the tool magazine 10 is stopped (Step S18).

In Step S19, the power supply to the servo motor 11 for driving the tool magazine 10 is kept stopped on standby until the tool changing command is outputted. When the tool changing command is outputted, the power supply to the servo motor 11 is resumed, waiting for the next indexing command (Step S20).

In the automatic tool changer adapted to perform the tool exchange between the tool magazine and the rotary tool spindle of the machine tool not directly but via the waiting tool pot, there is no need to arrest the tool magazine 10 in an exact angular position for the tool changing operation, and the power supply to the servo motor 11 can be stopped immediately after the tool held by the tool magazine 10 is transferred to the waiting tool pot. Therefore, the power consumption can further be reduced as compared with the automatic tool changer 1 which is adapted for the direct tool exchange between the tool magazine 10 and the rotary tool spindle.

Figure 4:
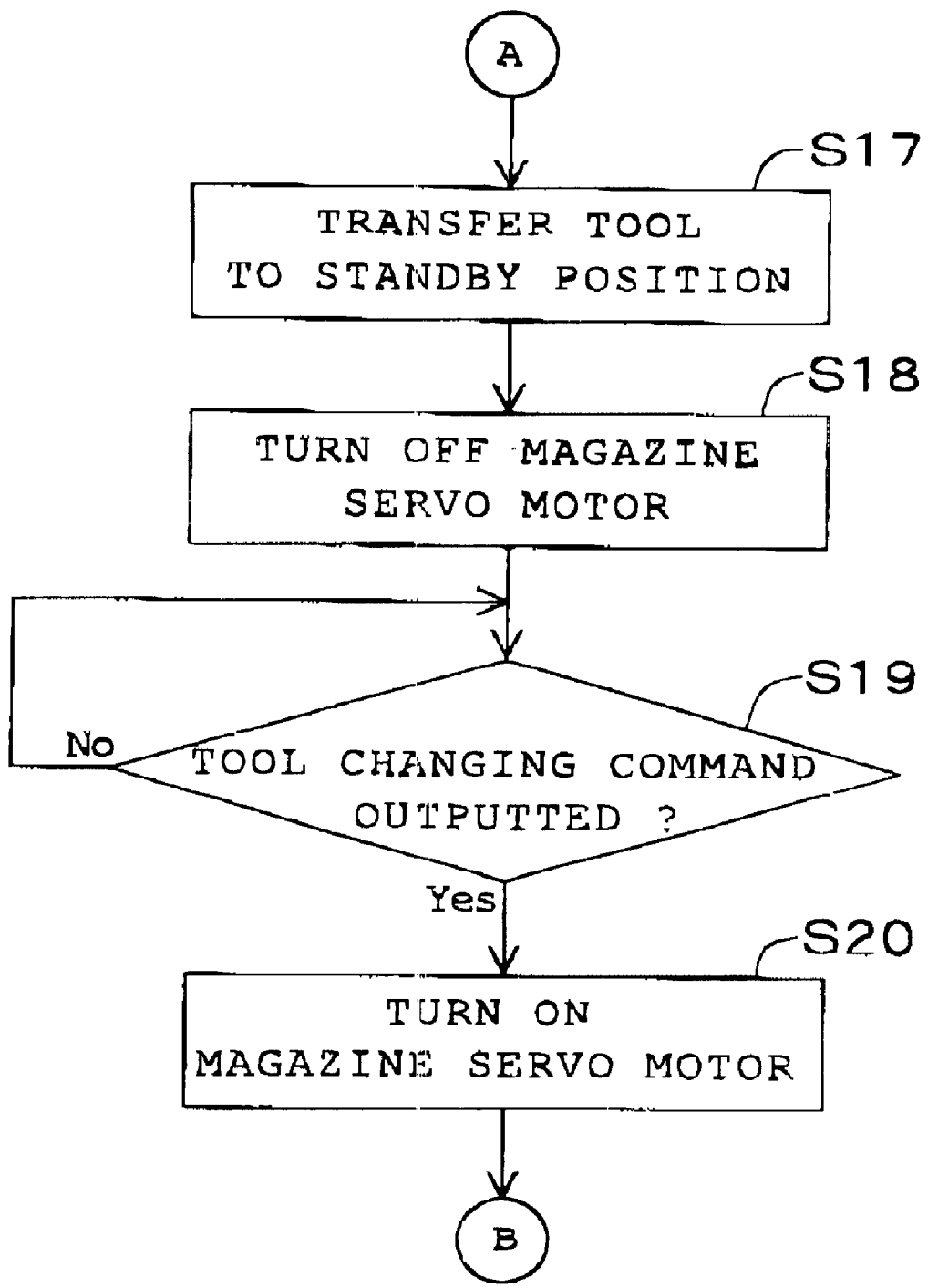
FIG. 4 is a flow chart for explaining a tool changing process to be performed by an automatic tool changer according to another embodiment of the present invention.

Although the power supply to the servo motor 11 is resumed immediately after the tool changing command is outputted in the flow chart shown in FIG. 4, the power supply to the servo motor 11 may be kept stopped until the next indexing command is outputted after the tool held by the tool magazine 10 is transferred to the waiting tool pot, because there is no need to arrest the tool magazine 10 in the exact angular position for the tool changing operation.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A process of automatically controlling an automatic tool changer which comprises a tool magazine to be rotatively indexed by a servo motor, said process comprising the steps of:

performing a tool magazine indexing operation in accordance with an indexing command and then performing a tool changing operation in accordance with a tool changing command;

temporarily stopping power supply to the servo motor if the next indexing command is not outputted within a predetermined time period after completion of the tool changing operation;

and resuming the power supply to the servo motor when the next indexing command is outputted.

2. The process of automatically controlling an automatic tool changer as set forth in claim 1, wherein the process further comprises the steps of: temporarily stopping the power supply to the servo motor if the next tool changing command is not outputted within the predetermined time period after completion of the tool magazine indexing operation; and resuming the power supply to the servo motor when the next tool changing command is outputted.

3. The process of automatically controlling an automatic tool changer as set forth in claim 1, the automatic tool changer further comprising a tool changer arm for direct tool exchange between the tool magazine and a rotary tool spindle of a machine tool, and a tool changer controlling section for controlling operations of the tool magazine and the tool changer arm in accordance with a machining program.

4. The process of automatically controlling an automatic tool changer as set forth in claim 2, the automatic tool changer further comprising a tool changer arm for direct tool exchange between the tool magazine and a rotary tool spindle of a machine tool, and a tool changer controlling section for controlling operations of the tool magazine and the tool changer arm in accordance with a machining program.

5. A process of automatically controlling an automatic tool changer which comprises a tool magazine to be rotatively indexed by a servo motor, and a waiting tool pot for temporarily holding a tool on standby, said process comprising the steps of:

performing a tool magazine indexing operation in accordance with an indexing command, then transferring a tool from the tool magazine to the waiting tool pot, and performing a tool changing operation in accordance with a tool changing command by tool exchange between the waiting tool pot and a rotary tool spindle of a machine tool;

temporarily stopping power supply to the servo motor if the next indexing command is not outputted within a predetermined time period after completion of the tool changing operation;

and resuming the power supply to the servo motor when the next indexing command is outputted.

6. The process of automatically controlling an automatic tool changer as set forth in claim 5, wherein the process further comprises the steps of: temporarily stopping the power supply to the servo motor upon completion of the transfer of the tool from the tool magazine to the waiting tool pot; and resuming the power supply to the servo motor when the next tool changing command is outputted.

7. A process of automatically controlling an automatic tool changer which comprises a tool magazine to be rotatively driven by a servo motor, and a waiting tool pot for temporarily holding a tool on standby, said process comprising the steps of:

performing a tool magazine indexing operation in accordance with an indexing command, then transferring a tool from the tool magazine to the waiting tool pot, and performing a tool changing operation in accordance with a tool changing command by tool exchange between the waiting tool pot and a rotary tool spindle of a machine tool;

temporarily stopping power supply to the servo motor upon completion of the transfer of the tool from the tool magazine to the waiting tool pot;

and resuming the power supply to the servo motor when the next indexing command is outputted.

* * * * *